Figure 1:
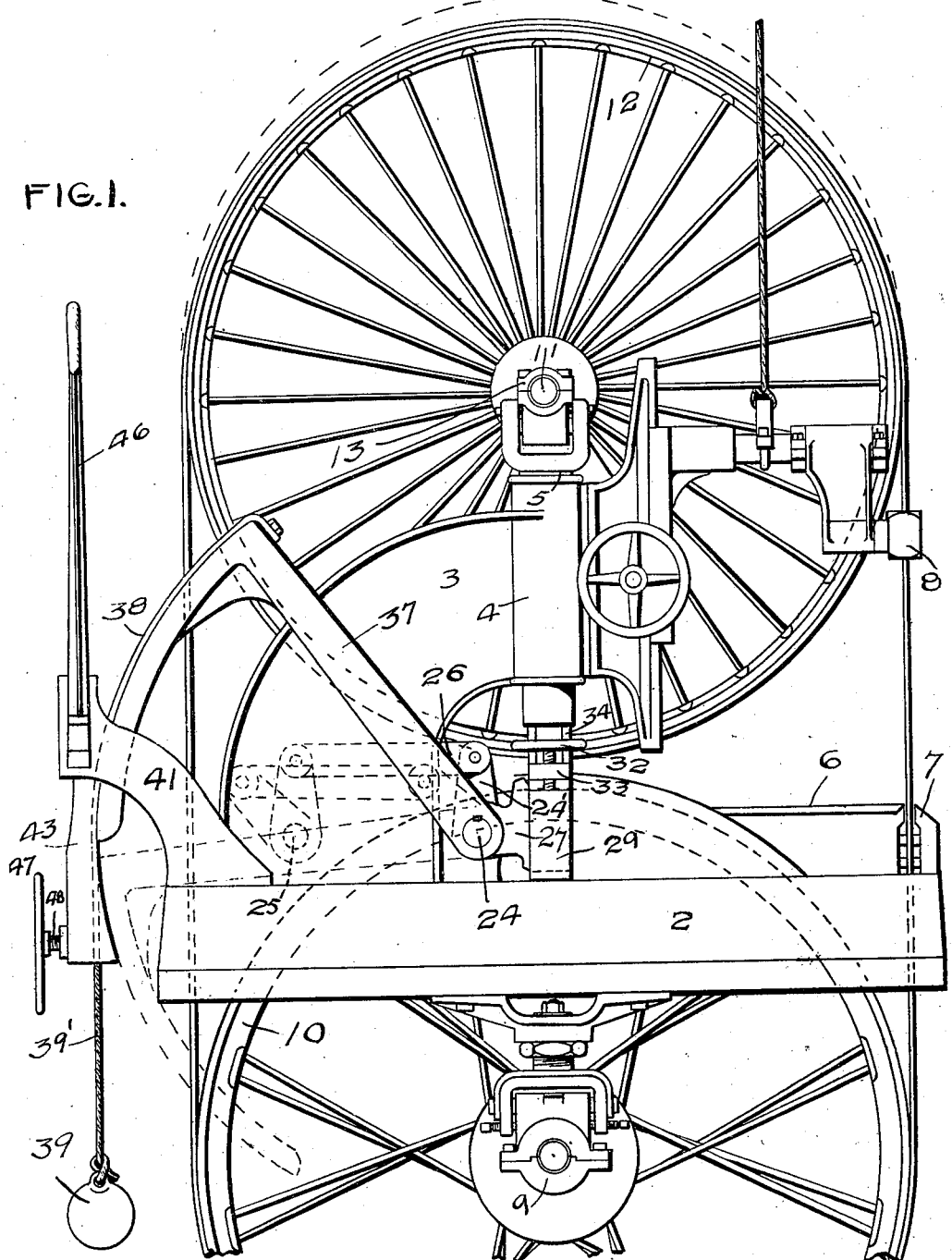

No. 658,166. Patented Sept. 18, 1900.
E. E. THOMAS.
BAND SAW MILL.
(Application filed July 22, 1899.)
(No Model.) 3 Sheets—Sheet 1.

WITNESSES
E. G. Staude
M. E. Cooley

INVENTOR
EDWIN E. THOMAS.
BY Paul O. Hawley
HIS ATTORNEYS.

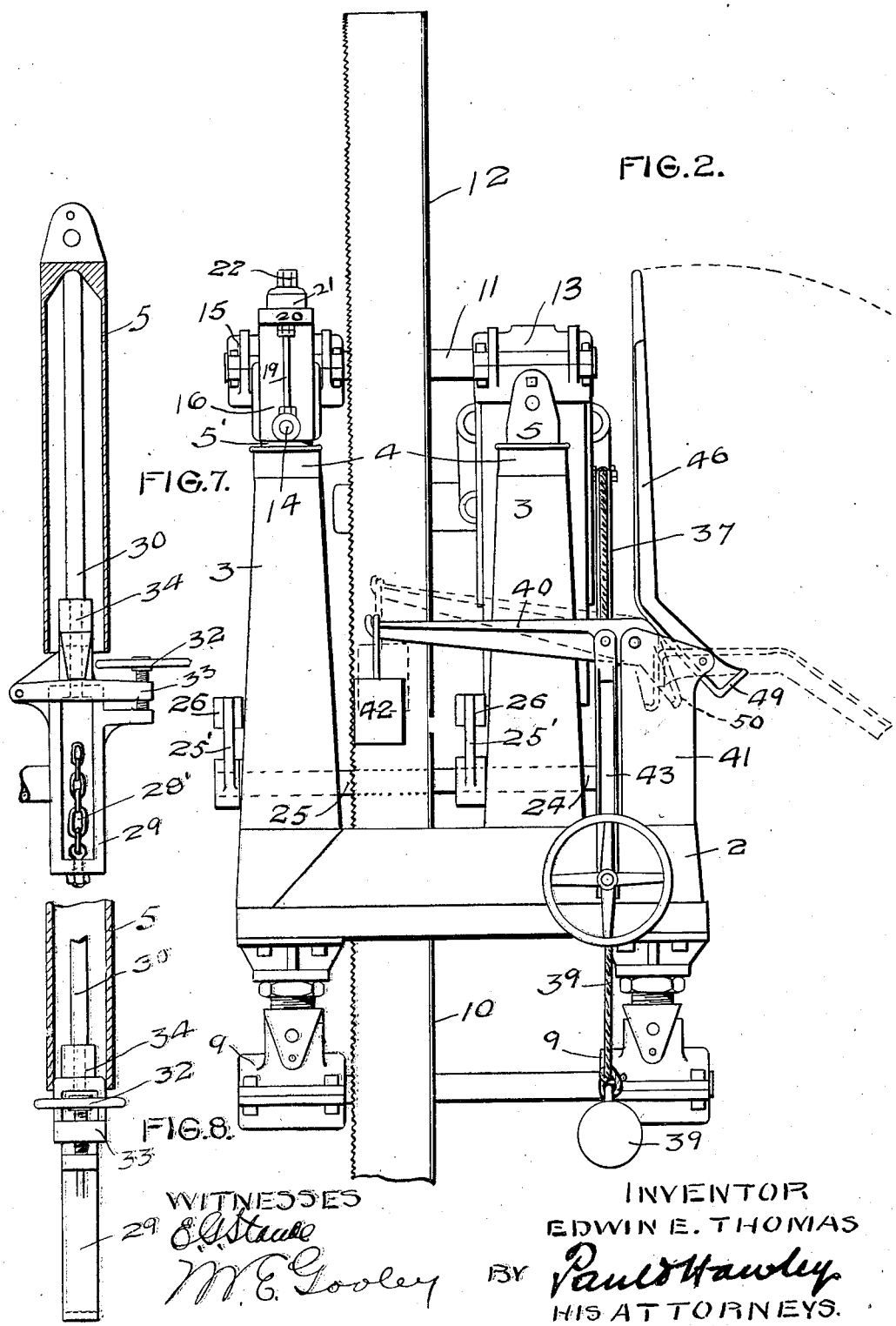

No. 658,166. Patented Sept. 18, 1900.
E. E. THOMAS.
BAND SAW MILL.
(Application filed July 22, 1899.)
(No Model.) 3 Sheets—Sheet 3.
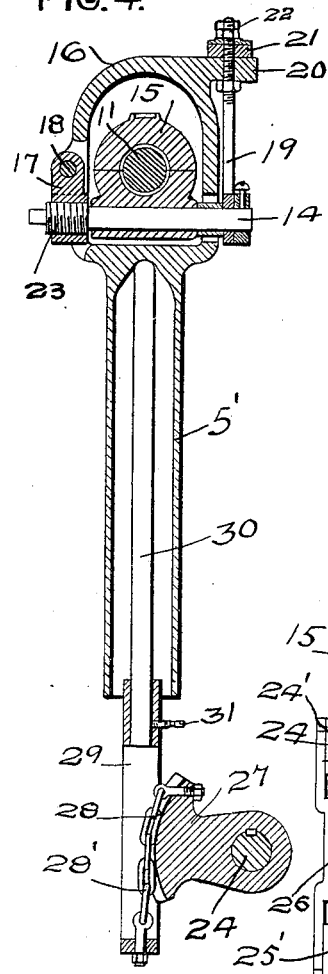
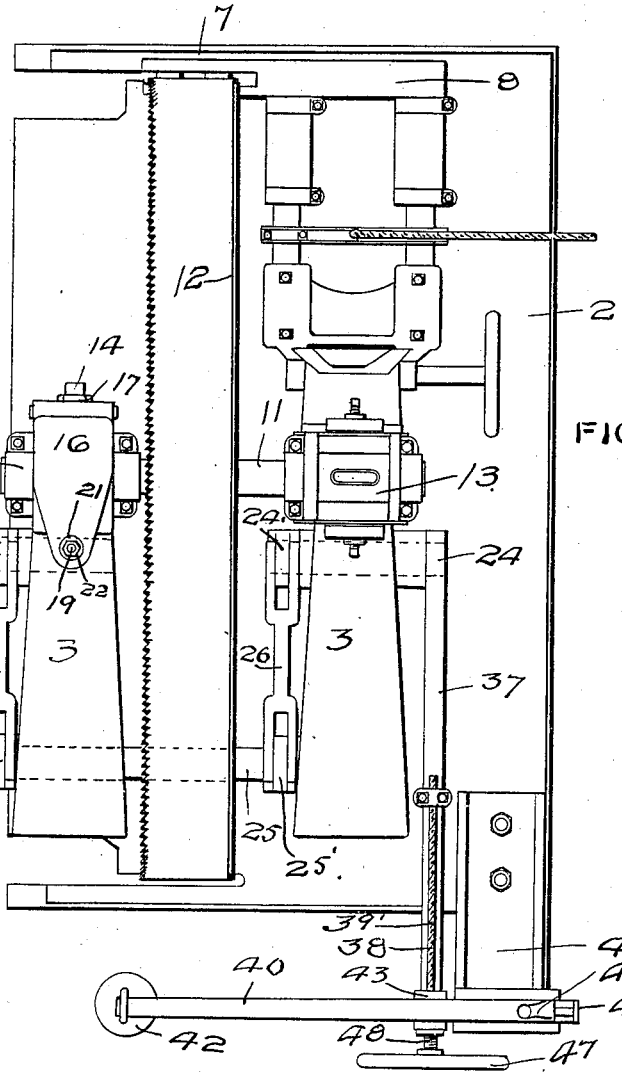
WITNESSES.
E. G. Staude
M. E. Cooley
INVENTOR
EDWIN E. THOMAS.
BY Paul O. Hawley
HIS ATTORNEYS.

UNITED STATES PATENT OFFICE.

EDWIN E. THOMAS, OF MINNEAPOLIS, MINNESOTA, ASSIGNOR TO THE UNION IRON WORKS, OF SAME PLACE.

BAND-SAW MILL.

SPECIFICATION forming part of Letters Patent No. 658,166, dated September 18, 1900.

Application filed July 22, 1899. Serial No. 724,731. (No model.)

*To all whom it may concern:*

Be it known that I, EDWIN E. THOMAS, of the city of Minneapolis, county of Hennepin, State of Minnesota, have invented certain new and useful Improvements in Band-Saw Mills, of which the following is a specification.

This invention relates to band-saw mills; and the object of the invention is to improve the construction of band-saw mills, and particularly to so construct the frame and the mechanism supporting the upper band-wheel that the upper band-wheel may run very closely above the lower wheel, thereby bringing the centers of the upper and lower wheels much closer together than usual and enabling the employment of shorter saws.

The particular object of the invention is to improve the construction and arrangement of the parts connecting the columns which bear the upper wheel.

To this end my invention consists generally in the combination, with the mill-frame, including bearings for the upper and lower band-wheels, of a "broken" shaft connecting the opposite columns belonging to the bearings for the upper band-wheel.

In band-saw mills of ordinary construction the rocking shaft or the balancing-levers that are employed to connect and support the columns and to maintain tension upon the saw are arranged between the two band-wheels, necessitating a considerable space between said wheels and also requiring the employment of long band-saws.

This invention consists particularly in the combination, with the columns, of short rocking shafts, one for each, and a shaft parallel therewith and having link connections with said short shaft, whereby said short shafts are connected and will rotate together as though in a single piece, so that the vertical movement of the two columns will be exactly alike as the same rise and fall under the varied tension of the saw or from movement imparted to either of the short shafts from the balance or tension levers.

The invention further consists in the novel construction of the columns and in a novel forward bearing for the shaft of the upper band-wheel; and the invention also includes a novel tension mechanism and means whereby the tension may be removed to permit the free vertical adjustment of the upper band-wheel, as is required when the saw is to be placed upon the wheels or removed therefrom.

The invention further consists in details of construction and in combinations of parts, all as hereinafter described, and particularly pointed out in the claims.

The invention will be more readily understood by reference to the accompanying drawings, forming a part of this specification, and in which—

Figure 1 is an end elevation of a band-saw mill embodying my invention. Fig. 2 is a side elevation thereof. Fig. 3 is a plan view of the same. Fig. 4 is an enlarged vertical section of the forward column and bearing of the machine. Fig. 5 is a vertical section of the clamp for the counterbalance of the upper band-wheel. Fig. 6 is a sectional view thereof on the line $x\,x$ of Fig. 5. Fig. 7 is a detailed view of the rear column of the machine. Fig. 8 is a view taken from Fig. 7 and enlarged from Fig. 1.

As shown in the drawings, 2 represents the base of the band-saw mill. 3 3 are the brackets thereon, each of which is provided with a vertical sleeve or bearing 4 for its column 5 5'. The saw-table 6 and guides 7 and 8 may be of any desired construction. The hangers or boxes 9 for the shaft of the lower band-wheel 10 are preferably adjustable. The boxes for the shaft 11 of the upper band-wheel 12 are arranged in the upper ends of the columns 5 5'. The rear column 5 is provided with a single yoke wherein the box or bearing 13 is pivoted. The box or bearing for the forward end of the shaft 11 is of a more complicated construction, inasmuch as a pivot-pin 14, whereon the bearing 15 is swung, is adapted to yield and permit said bearing to drop slightly when an unusual tension is placed upon the saw, as at the instant when the saw strikes into a log. The details of this construction are shown in Fig. 4. The column 5' is provided with an arch 16 in place of the yoke upon the other column. The pivot-pin is held at one end by a swinging block 17, pivoted by a cross-pin 18 in one end of the arch 16. The opposite end of the pivot-pin 14 hangs upon a strap 19, that depends from the bracket extension 20 of the arch, upon the top of which is a rubber cushion 21, which latter is adapted to yield slightly (a small fraction of an inch) when the upper wheel is forcibly drawn down by sudden strain upon the saw. The pin 14 may be vertically adjusted by means of the lock-nuts 22 upon the strap 19, the lower one of which limits the vertical rise of the shaft and of the upper wheel when the strain upon the saw is released. The compression of the rubber cushion is such that the same will sustain the weight of the wheel under ordinary running conditions. The box 15 is preferably rendered adjustable transversely by the employment of the screw-thread 23 on the pivot-pin 14 and within the hanger-block 17. As shown, the wheels that support the band-saw are very close together, and to connect and support the columns I arrange between the columns the broken shafting to which the tension-leverage is applied and comprising the short shafts 24 24, which are in line, and the parallel shaft 25, which is considerably removed from the shafts 24 and is connected to the same by means of the arms 24' 25' and the strong links 26, whereby the movement of one short shaft is communicated to the other. The tension is applied to one of the short shafts 24, preferably the rear one. The connection between each short shaft and the column above it is made by means of a rocker-arm 27, provided upon the short shaft and having a quadrant or sector 28, grooved to receive the equivalent hanging connection 28', extending between the upper part of the sector and the lower end of the foot 29, which is arranged at the lower end of the column-rod 30. The columns are hollow and hang upon the upper ends of their column-rods 30. The forward column-rod is permanently secured in the footpiece 29 by set-screws 31, while the rear column is rendered adjustable independently of the forward column for the purpose of tilting the upper wheel. This adjustment is secured by means of the jack-screw and lever 32 and 33, respectively. (Shown in Figs. 1, 7, and 8.) The foot 29 in this case is provided with the brackets upon which the lever 33 is pivoted and the screw 32 rests. The lever 33 is in the form of a yoke, upon which the block 34 rests, which block carries the weight of the rod 30, the column, and the upper wheel. In this manner adjustment may be made between the foot 29 and the column 5. The upper band-wheel is counterbalanced by means of the long lever 37, extending from the short shaft 24 upon the rear side of the machine and provided with the quadrant or sector 38 from a rope or strap upon which the weight 39 depends. The leverage is such that a very small weight at this point is sufficient to balance the upper wheel and the parts whereon the same is supported. The tension upon the saw is secured and regulated by means of the lever 40, pivoted upon the standard or post 41 on the rear corner or base. This lever is provided with an adjustable weight 42, and the force thereof is exerted upon the upper wheel of the mill through the depending link 43, intermediately pivoted upon the lever 40 and attached to the counterbalance-rope 39' by a suitable clamp that is arranged at the lower end of the link 43. After the saw has been placed upon the wheels and the upper wheel is raised into position by a very slight additional downward pull on the counterbalance-rope the lever 40, with its weight, is raised, and thereafter the clamp of the link 43 is secured upon the counterbalance-rope, so that when the lever 40 is released its weight will be exerted upon the lever 37 in addition to the weight of the counterbalance, giving the required tension upon the saw. The clamp in the link 43 is shown in detail in Figs. 5 and 6. As there shown, the rope extends through an eye or guide 45 in the lower end of said link and is bound therein by a gib 45', the upper end of which engages a shoulder 45'' in the link, and which gib is adjusted by means of a hand-wheel 47 and screw 48, all arranged within the lower end of the link. To facilitate the removal of the tension from the saw and to lock the tension-lever 40 in its raised position, I preferably provide the lifting and locking lever 46 upon the standard 41, said lever having a square end 49 to engage the obtuse cam-arm 50 upon the lever 40, first raising said lever and then by the engagement of the flat or square end of the lever 46 with the straight surface of the arm 50 locking the lever 40 in its raised position, after which the clamp may be removed from the rope 39' and the upper wheel of the band-mill may be freely raised or lowered until such time as it is again necessary to clamp the tension-lever to the counterbalance-rope and release said lever.

The principal advantage of my band-saw mill grows out of the close arrangement of the band-wheels, enabling the employment of short band-saws, while permitting the employment of longer saws when the band-wheel is raised. This is only accomplished by carrying back between the band-wheels the connections of the columns.

It is obvious that my invention admits of various modifications, which will readily suggest themselves to one skilled in the art, and I therefore do not confine myself to the details of construction herein shown and described.

Having thus described my invention, I claim as new and desire to secure by Letters Patent—

1. The combination, in a band-saw mill, with the base and the upper and lower band-wheels, of the columns for supporting the upper band-wheel, column-supporting rods provided with foot-pieces depending below the top of the lower band-wheel, and suitable connections between said foot-pieces, substantially as described.

2. The combination, in a band-saw mill, with the base and the upper and lower band-wheels, of the columns for supporting the upper band-wheel, the short shafts mounted in suitable bearings, connections between said shafts and said columns through which force is applied to exert tension upon the band-saw, and means connecting said short shafts, substantially as described.

3. The combination, in a band-saw mill, with the base and the upper and lower band-wheels, of the columns provided with bearings for the upper wheel, the short rocker-shafts arranged beneath said columns, connections between said rocker-shafts and said columns, the rocker-shaft parallel to said short rocker-shafts and suitably connected thereto, and tension mechanism connected with said rocker-shafts, substantially as described.

4. The combination, in a band-saw mill, with the base and the upper and lower band-wheels, of the columns provided with bearings for the upper wheel, the short rocker-shafts arranged below and connected with said columns, the rocker-shaft arranged parallel with said short rocker-shafts and suitably connected thereto, a tension mechanism and a counterbalance connected with said rocker-shafts, substantially as described.

5. The combination, in a band-saw mill, with the base and the upper and lower band-wheels, of the vertically-movable columns provided with bearings for the upper wheel, the rocker-shafts having suitable connections with said columns, the parallel-movement connections between the rocker-shafts upon opposite sides of said wheels, and suitable means connected to said shafts for maintaining tension upon the saw carried by said wheels, substantially as described.

6. The combination, in a band-saw mill, with the base and the upper and lower band-wheels, of the columns provided with bearings for the upper wheel, the short rocker-shafts, connections between said rocker-shafts and said columns, suitable connections between said rocker-shafts eccentrically arranged with respect thereto, whereby said rocker-shafts may be caused to rock or turn in their bearings, and tension and counterbalance mechanism connected with said rocker-shafts, substantially as described.

7. The combination, in a band-saw mill, with the base and the upper and lower band-wheels, of vertically-movable columns provided with bearings for the upper wheel, rocker-shafts provided upon opposite sides of said wheel, connections between said rocker-shafts and said columns, the parallel shaft 25 mounted in suitable bearings and arranged out of line with said rocker-shafts, arms upon all of said shafts, links connecting said arms, and a tension-lever connected to one of said shafts, substantially as described.

8. The combination, in a band-saw mill, with the base and the upper and lower band-wheels, of the vertically-adjustable columns provided with bearings for the upper wheel, the short rocker-shafts arranged below said columns, a shaft mounted in suitable bearings and arranged parallel with said rocker-shafts and connected thereto, whereby said rocker-shafts and said parallel shaft are caused to move together, means for applying force to said shafts to maintain tension upon the saw carried by said band-wheels and connections between said short shafts and said columns, substantially as described.

9. The combination, in a band-saw mill, with the base and the upper and lower band-wheels, of the vertically-adjustable columns provided with bearings for the upper wheel, the short rocker-shafts arranged beneath said columns, the parallel shaft connected thereto and whereby said rocker-shafts are caused to move together, means for applying force to said shafts to maintain tension upon the saw carried by said band-wheels, a tension and counterbalance lever connected to one of said short rocker-shafts, a quadrant upon said lever, a counterbalance-weight supported by said quadrant, and a separate tension-lever provided with adjustable means for connecting it with the means for supporting said weight, substantially as described.

10. The combination, in a band-saw mill, with the base and the upper and lower band-wheels, of the supports for the upper wheel, connections between said supports whereby said supports are caused to move together, the tension and counterbalance lever 37 provided with the quadrant 38, the rope or cord thereon, the counterbalance-weight upon said rope, the tension-lever 40 suitably weighted, a pivotal link depending therefrom and provided with a clamp for attachment upon said rope, and a lifting and locking lever arranged to operate upon said tension-lever, substantially as described.

11. The combination, in a band-saw mill, with the base and the upper and lower band-wheels, of the supports for the upper wheel, a tension-lever 40 provided with a suitable weight, means connecting said tension-lever with said supports to maintain tension upon the saw carried by said band-wheels, and means for raising said tension-lever and thereby relieving the tension from the band-wheel supports, and means for locking said lever in its raised position to relieve the tension on the saw, substantially as described.

12. The combination, in a band-saw mill, with the base and the upper and lower band-wheels, of the supports for the upper wheel, connections between said supports, a tension device applied to said connections, and provided with a counterbalance rope and weight, a pivoted lever 40 provided with a heel 48 and adjustable means for connecting said lever with said rope, and a pivoted lifting and locking lever 46 arranged to engage said lever 40, and adapted to lock against said heel 48 and hold the lever 40 in its raised position, substantially as described.

13. The combination, in a band-saw mill, with the upper band-wheel and its supporting means, of a tension device connected to said supporting means and provided with a counterbalance rope and weight, a pivoted lever 40, a link connected to said lever and provided with an eye through which the counterbalance-rope passes, and with means for clamping said rope to said link, and means for raising and locking said lever 40, substantially as described.

14. The combination, in a band-saw mill, with the base and upper and lower band-wheels, of the columns for the upper band-wheel, column-supporting rods provided with suitable feet, rocking shafts arranged beneath said columns and provided with quadrants or sectors 27, flexible connections between said quadrants or sectors and the feet of said rods, and a tension device connected with said rocking shafts, substantially as described.

15. The combination, in a band-saw mill, with the base and the upper and lower band-wheels, of the columns provided with bearings for the upper band-wheel, rocking shafts arranged below said columns, a shaft mounted in suitable bearings parallel to said rocking shafts, connections between said parallel shaft and said rocking shafts, column-supporting rods, quadrants upon said rocking shafts, chains or cords upon said quadrants connected to said rods, and a tension device connected to said rocking shafts, substantially as described.

16. The column-adjuster for band-saw mills, comprising, in combination, the column-lifting rod, the rod-foot, the lever 33 thereon, the fork at the lower end of the rod 30 resting upon said lever, the end of said rod extending into said foot, and an adjusting-screw applied between said lever and said foot, substantially as described.

17. The combination, in a band-saw mill, with the base, of the columns supporting the upper band-wheel, bearings pivoted in the upper portions of said columns, and a cushion arranged above one of said bearings and supporting it upon its column, substantially as described.

18. The combination, in a band-saw mill, with the band-wheel-supporting column, of a wheel-shaft bearing, a pivot-pin connected with said bearing, a hanger pivotally supporting one end of said pin upon said column, and a cushion-support for the opposite end of said pin, substantially as described.

19. The combination, in a band-saw mill, with the band-wheel-supporting column, of a wheel-shaft bearing, a pivot-pin connected with said bearing, a hanger pivotally supporting one end of said pin upon said column, said hanger being arranged upon one side of said bearing, and a cushion-hanger for the opposite end of the said bearing depending from a vertical extension of said column, substantially as described.

20. The combination, in a band-saw mill, with the band-wheel-supporting column, with an arch 16 upon said column, of the shaft-bearing arranged within said arch, a pivot-pin connected with said bearing and supported at one end upon said arch by a pivoted hanger, and the cushion-hanger depending from said arch, and supporting the other end of said pivot-pin, substantially as described.

21. The combination, in a band-saw mill, with the band-wheel-supporting column, provided with the arch 16, of a wheel-shaft bearing arranged within said arch, a pivot-pin connected with said bearing and upon which said bearing is longitudinally adjustable, and a cushion-support for said pivot-pin, substantially as described.

In witness whereof I have hereunto set my hand this 18th day of July, 1899.

EDWIN E. THOMAS.

In presence of—
  C. G. HAWLEY,
  M. E. GOOLEY.